W. A. WITTEN.
RESILIENT WHEEL.
APPLICATION FILED NOV. 28, 1919.

1,338,061. Patented Apr. 27, 1920.

INVENTOR.
William A. Witten
BY John M. Spellman
ATTORNEYS.

UNITED STATES PATENT OFFICE.

WILLIAM A. WITTEN, OF DUNCAN, OKLAHOMA.

RESILIENT WHEEL.

1,338,061.  Specification of Letters Patent.  Patented Apr. 27, 1920.

Application filed November 28, 1919. Serial No. 341,254.

*To all whom it may concern:*

Be it known that I, WILLIAM A. WITTEN, a citizen of the United States, residing at Duncan, in the county of Stephens and State of Oklahoma, have invented certain new and useful Improvements in Resilient Wheels, of which the following is a specification.

My invention relates to improvements in spring or resilient vehicle wheels and in such connection it relates more particularly to the arrangement and construction of such a wheel.

The principal object of my invention is to provide a vehicle wheel of the character described which may be used with solid rubber tires or pneumatic tires and which is very durable and relatively simple in construction and not of expensive manufacture My invention will be more fully understood from the following description, taken in connection with the accompanying drawings, forming part hereof in which—

Referring more particularly to the drawings, 1 denotes the hub of the wheel, 2 the spokes and 3 and 4 the felly and tire, respectively.

Figure 1:
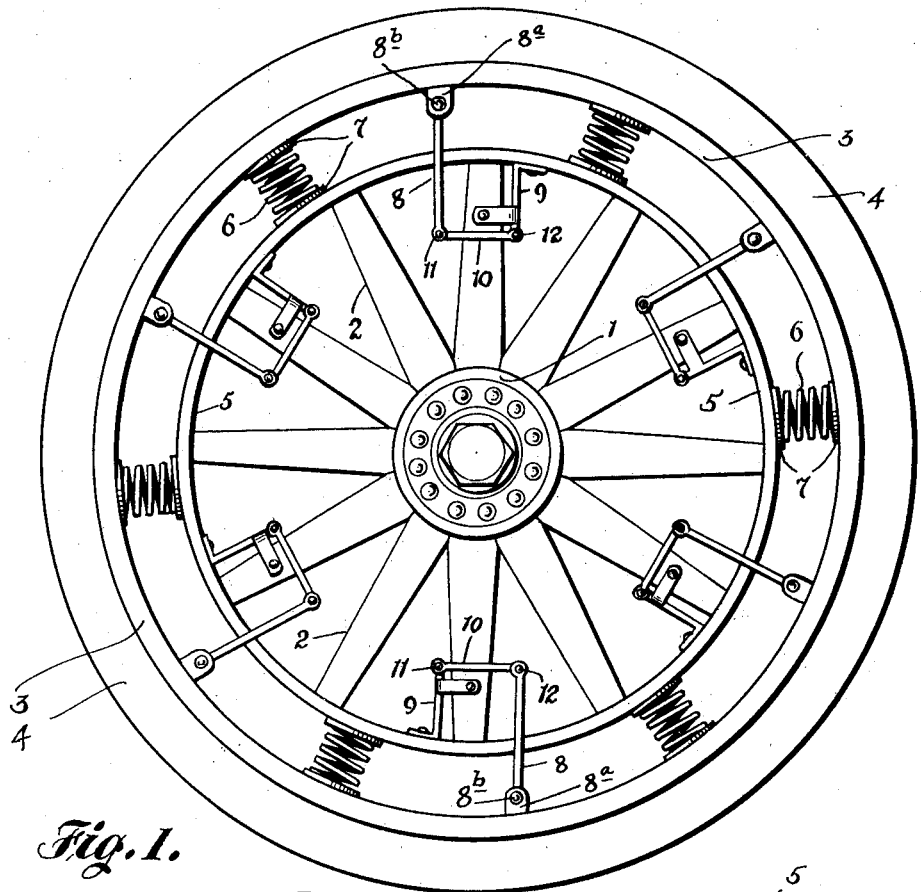
Figure 1 is a side elevational view of a wheel embodying my invention.

Between the felly 3 and the ends of the spokes 2 is a rim 5 to which the spokes are connected, an annular space being provided between the felly and rim for the springs 6 which, as indicated in Fig. 1, are disposed at suitable intervals around the peripheries of the rim 5 and felly 3, each end of the spring supported in a cup 7 attached to the felly and rim in any suitable manner.

Figure 2:
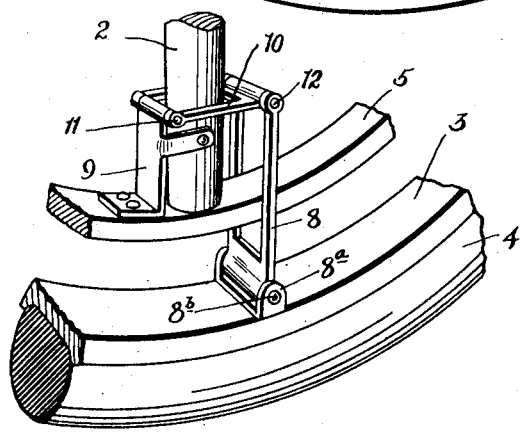
Fig. 2 is a detail perspective view of a portion of the wheel showing the manner of connecting the rim to the felly.
Figure 3:
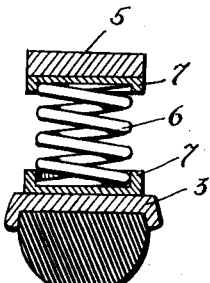
Fig. 3 is a cross sectional view of the tire, felly and rim, illustrating the means employed to fasten the springs to the felly and rim.

The coiled springs 6 thus interposed between the felly 3 and rim 5 and firmly seated in the cups 7 allows the rim 5 carrying the spokes free movement in any direction except laterally, that is the hub, spokes and rim are prevented from moving in a direction at right angles to the felly and tire by the brace, as shown in Fig. 2, the main link 8 of which brace is pivoted to the felly 3 by the support and pin $8^a$ and $8^b$, the arms of the link passing around the rim 5 at the point of intersection of the rim and link. Rigidly attached to the rim 5 and spoke 2 is a support 9 for the smaller link 10 which is pivoted thereto by a pin 11. The arms of the link 10 also pass around the spoke 2 in a manner similar to the arrangement of link 8 and rim 5, both links 8 and 10 being pivoted together by the pin 12. The spokes 2 and rim 5 have thus free play between the arms of the links, the links preventing lateral movement of the rim 5.

Changes may be made in the details of construction of the wheel without materially departing from the spirit of the invention.

Having thus described the nature and objects of my invention, what I claim as new and desire to secure by Letters Patent, is—

The combination with a vehicle wheel of a felly and an inner rim, springs between the felly and rim, of a plurality of braces pivotally attached to the rim and felly, each of said braces comprising two pivoted links, one link having its arms passing around the rim, the arms of the other link passing around the spokes, both links pivoted together to form a brace, and means for retaining the springs between the felly and rim.

In testimony whereof I have signed my name to this specification.

WILLIAM A. WITTEN.